(12) United States Patent
Jovanovic et al.

(10) Patent No.: US 6,741,388 B2
(45) Date of Patent: May 25, 2004

(54) COHERENT WHITE LIGHT AMPLIFICATION

(75) Inventors: Igor Jovanovic, Oakland, CA (US); Christopher P. J. Barty, Hayward, CA (US)

(73) Assignee: The Regents of the University of California, Oakland, CA (US)

( * ) Notice: Subject to any disclaimer, the term of this patent is extended or adjusted under 35 U.S.C. 154(b) by 7 days.

(21) Appl. No.: 10/316,427

(22) Filed: Dec. 11, 2002

(65) Prior Publication Data

US 2003/0147122 A1 Aug. 7, 2003

Related U.S. Application Data

(60) Provisional application No. 60/340,643, filed on Dec. 13, 2001.

(51) Int. Cl.$^7$ ................................. H01S 3/00
(52) U.S. Cl. ........................ 359/333; 359/346
(58) Field of Search ................ 359/333, 346, 359/330; 372/22

(56) References Cited

U.S. PATENT DOCUMENTS

| | | | |
|---|---|---|---|
| 5,047,668 A | | 9/1991 | Bosenberg |
| 5,400,350 A | | 3/1995 | Galvanauskas et al. |
| 5,594,592 A | * | 1/1997 | Harlamoff et al. ........... 359/330 |
| 5,640,480 A | * | 6/1997 | Komine ..................... 385/122 |
| 5,696,782 A | | 12/1997 | Harter et al. |
| 5,781,571 A | * | 7/1998 | Nabors et al. ................ 372/21 |
| 5,862,287 A | | 1/1999 | Stock et al. |
| 5,930,030 A | | 7/1999 | Scifres |
| 6,181,463 B1 | | 1/2001 | Galvanauskas et al. |
| 6,198,568 B1 | | 3/2001 | Galvanauskas et al. |
| 6,208,458 B1 | | 3/2001 | Galvanauskas et al. |
| 6,282,014 B1 | | 8/2001 | Long |
| 6,320,886 B1 | | 11/2001 | Dawber et al. |
| 6,334,011 B1 | | 12/2001 | Galvanauskas et al. |

2002/0001321 A1    1/2002 Perry

FOREIGN PATENT DOCUMENTS

JP         07281228 A   * 10/1995

OTHER PUBLICATIONS

Mark A. Dreger, et al., "Coupled thermal and nonlinear effects for beam propagation in anisotropic crystals," SPIE, vol. 2145, pp. 254–269 (16 pages), 0–8194–1440, 9/94.

John Collier, et al., "Evaluation of an ultrabroadband high--gain amplification technique for chirped pulse amplification facilities," Applied Optics, vol. 38, No. 36, pp. 7486–7493, (8 pages), Dec. 20, 1999.

David Eimerl, "High Average Power Harmonic Generation," IEEE Journal of Quantum Electronics, vol. QE–23, No. 5, pp. 575–592 (18 pages), May 1987.

David Eimerl, "Frequency conversion materials from a device perspective," SPIE vol. 681, Laser and Nolinear Optical Materials, pp. 2–5 (4 pages), 1986.

A. Dubietis, er al., "Powerful femtosecond pulse generation by chirped and stretched pulse parametric amplification in BBO crystal," Optics Communications 88, pp. 437–440 (4 pages), Apr. 1, 1992.

* cited by examiner

*Primary Examiner*—Mark Hellner
(74) *Attorney, Agent, or Firm*—Eddie E. Scott; Alan H. Thompson

(57) ABSTRACT

A system for coherent simultaneous amplification of a broad spectral range of light that includes an optical parametric amplifier and a source of a seed pulse is described. A first angular dispersive element is operatively connected to the source of a seed pulse. A first imaging telescope is operatively connected to the first angular dispersive element and operatively connected to the optical parametric amplifier. A source of a pump pulse is operatively connected to the optical parametric amplifier. A second imaging telescope is operatively connected to the optical parametric amplifier and a second angular dispersive element is operatively connected to the second imaging telescope.

52 Claims, 3 Drawing Sheets

COHERENT WHITE LIGHT AMPLIFICATION

CROSS-REFERENCE TO RELATED APPLICATIONS

This application claims the benefit of U.S. Provisional Application No. 60/340,643 filed Dec. 12, 2001 and titled "Method for Coherent White Light Amplification." U.S. Provisional Application No. 60/340,643, filed Dec. 13, 2001, titled "Method for Coherent White Light Amplification" is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to coherent light amplification and more particularly to coherent white light amplification.

2. State of Technology

U.S. Pat. No. 5,400,350 for a method and apparatus for generating high energy ultrashort pulses to Almantas Galvanauskas issued Mar. 21, 1995 provides the following background information, "Both semiconductor sources (e.g., diode) and fiber sources are known which can produce ultrashort energy pulses having sub-picosecond pulse durations. Although these energy sources can provide reliable, robust operation in a compact, cost-effective manner, their inability to produce pulse energies comparable to those of large frame solid-state sources has limited their practical use."

U.S. Pat. No. 5,930,030 for apparatus for pumping an optical gain medium with multiple light wavelengths to Donals R. Scifres issued Jul. 27, 1999 provides the following information, "An apparatus for pumping an optical gain medium, such as a fiber gain medium, comprises a pump source having a plurality of different spatially separate or multiple wavelengths or wavelength bands which are all coupled into the fiber gain medium and provide at least one or more wavelengths to fall within the absorption band of fiber gain medium producing gain despite wavelength shifts in the pump source multiple wavelengths due to changes in the operating temperature of the pump source. At least one or more of the pump wavelengths will overlap the gain spectrum of the fiber gain medium sufficiently to continually provide high input power for pumping of the fiber gain medium."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for coherent simultaneous amplification of a broad spectral range of light. The system includes an optical parametric amplifier and a source of a seed pulse. A first angular dispersive element is operatively connected to the source of a seed pulse. A first imaging telescope is operatively connected to the first angular dispersive element and operatively connected to the optical parametric amplifier. A source of a pump pulse is operatively connected to the optical parametric amplifier. A second imaging telescope is operatively connected to the optical parametric amplifier and a second angular dispersive element is operatively connected to the second imaging telescope.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
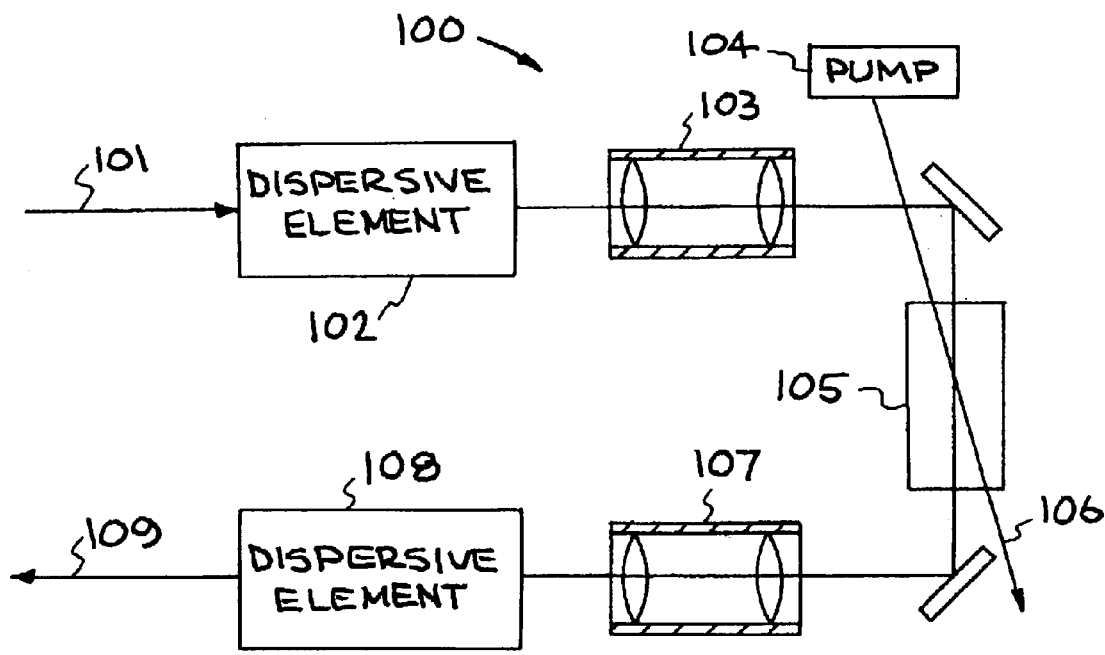
FIG. 1 illustrates an embodiment of a system constructed in accordance with the present invention.

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings, and in particular to FIG. 1, an embodiment of a system constructed in accordance with the present invention is illustrated. The system is designated generally by the reference numeral 100. The system 100 provides coherent simultaneous amplification of the entire spectral range of visible light in a single, solid-state, crystal-based amplifier. Optical parametric amplification with angularly dispersed seed beam is used. A convenient pump wavelength is selected and the pump beam is introduced in the crystal at a noncollinear angle with respect to the signal center wavelength.

The present invention has many uses. For example, it can be used for amplification of ultrashort pulses in nanosecond optical parametric chirped pulse amplifiers. It can also be used for white light amplifiers and ultrashort pulse amplifiers for chirped pulse amplification systems.

Coherent amplification of optical pulses with very broad bandwidth is of interest for generation of high peak power. One problem with coherent amplification in a laser is the relatively narrow gain profile of typical laser media. While laser media such as Ti:sapphire can amplify broad bandwidth around a fixed center wavelength, there is no solid-state laser material which can amplify the entire spectral range of visible light. Dye lasers have been used for broadband tunable amplification, but their bandwidth is limited. Simple optical parametric amplification or Raman amplification does not cover the entire visible spectral range.

The system 100 provides coherent simultaneous amplification of the entire spectral range of visible light in a single, solid-state, crystal-based amplifier. Sources based on self-phase modulation can be used to produce short pulses with broad spectrum (continuum). Additional stretching of those pulses can be performed using a dispersive delay line, such as an optical fiber or a diffraction grating-based stretcher. Pulses can be amplified to high energy in an optical parametric amplifier (OPA) as described below. Chirped pulse amplification in an optical parametric amplifier (OPA) has been named parametric chirped pulse amplification (PCPA) and optical parametric chirped pulse amplification (OPCPA). Amplified pulses can be recompressed if an ultrashort pulse is sought.

In order to enable amplification of very broad bandwidth in an OPA, it is important to identify the sources of spectral narrowing. The sources of spectral phase must be also determined if recompression to short pulses is desired. The primary intrinsic source of spectral narrowing and spectral phase in OPA is the wavevector mismatch $\Delta k$. It is apparent that the gain bandwidth can be increased simply by using nearly the same length of gain medium, but separated into shorter stages with idler separation between stages. This leads to a complicated setup and does not eliminate the problem of the cumulative spectral phase.

Previous designs of broadband OPAs used perfectly collimated seed pulses propagating through the crystal at a specific noncollinear angle that maximizes the gain bandwidth. The idea of using noncollinear phase matching for a single wavelength can be extended to the use of angular dispersion of the broadband seed to perfectly phase match the entire signal spectrum. A similar method has been successfully used previously for broadband frequency doubling.

An embodiment of a system that can amplify the entire visible spectrum is illustrated in FIG. 1. The wavelength of visible light ranges from about 350–400 nm to about 750–800 nm. White light seed 101 is introduced into an angular dispersion element 102 such as a prism or a diffraction grating. A combination of dispersive elements may be used to achieve the correct angular dispersion for perfect phase matching in OPA. An imaging telescope 103 relays the correct angular dispersion from the appropriate point at the output of the dispersive element to an optical parametric amplifier (OPA) 105. Such angular dispersion can be easily reproduced in a multi-crystal system by relay imaging.

A pump 104 provides a pump wavelength chosen to be 266 nm (the fourth harmonic of a Nd:YAG laser). Pump pulses at this wavelength can be obtained with relatively high energy. This pump wavelength is also convenient because it guarantees that the entire spectral range of the idler pulse remains within the transparency range for most nonlinear crystals that can be used as OPAs.

The pump is introduced into the OPA 105 at a noncollinear angle with respect to the signal center wavelength, which allows the angular dispersion of the seed to be nearly linear. It also permits easier separation of the idler beam in type I mixing.

The system 100 provides coherent simultaneous amplification of a broad spectral range of light. The system 100 comprises an optical parametric amplifier 105, a source of a seed pulse 101, a first angular dispersive element 102 operatively connected to the source of a seed pulse 101, a first imaging telescope 103 operatively connected to the first angular dispersive element 102 and operatively connected to the optical parametric amplifier 105, a source of a pump pulse 104 operatively connected to said optical parametric amplifier 105, a second imaging telescope 107 operatively connected to said optical parametric amplifier, and a second angular dispersive element 108 operatively connected to said second imaging telescope that produces an amplified signal 109. The system 100 provides a method of coherent simultaneous amplification of a broad spectral range of visible light. The method includes the steps of: introducing a seed pulse into a first angular dispersive element producing a first dispersive element output; directing the first dispersive element output into a first imaging telescope; directing the first dispersive element output from the first imaging telescope into an optical parametric amplifier; directing a pump pulse into the optical parametric amplifier, the optical parametric amplifier producing an optical parametric amplifier output; directing the optical parametric amplifier output into a second imaging telescope; and directing the optical parametric amplifier output from the second imaging telescope into a second angular dispersive element to produce an amplified signal.

Figure 2:
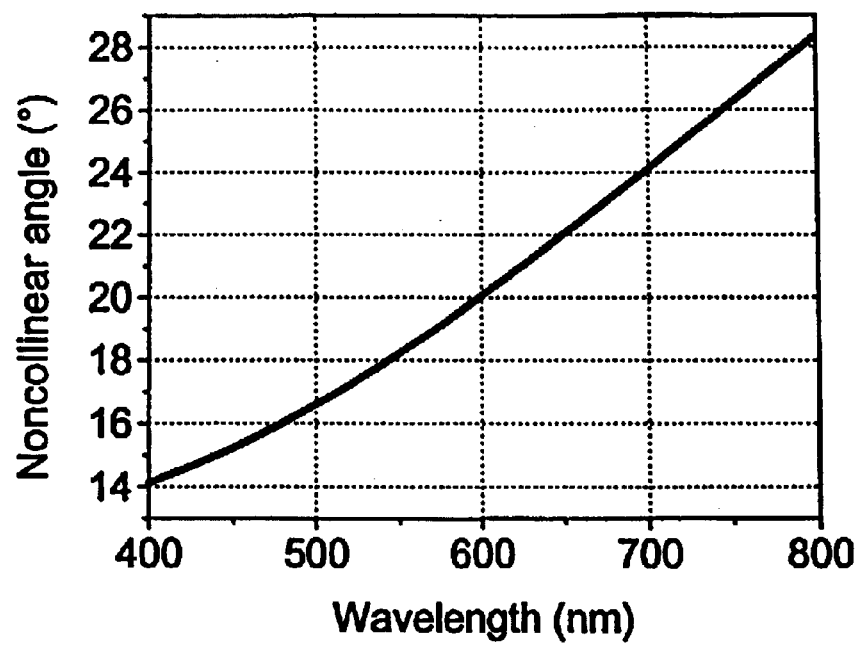
FIG. 2 shows the calculated angular dispersion for a signal over the entire spectral range 400–800 nm.

Applicants performed calculations for angular dispersion using beta-barium borate (BBO) as the OPA. The calculated angular dispersion for the signal over the entire spectral range 400–800 nm is shown in FIG. 2. The chosen noncollinear angle for the pump is 20° at the center wavelength of 600 nm, and the angle between the crystal z-axis and the pump beam is 59.7°.

Figure 3:
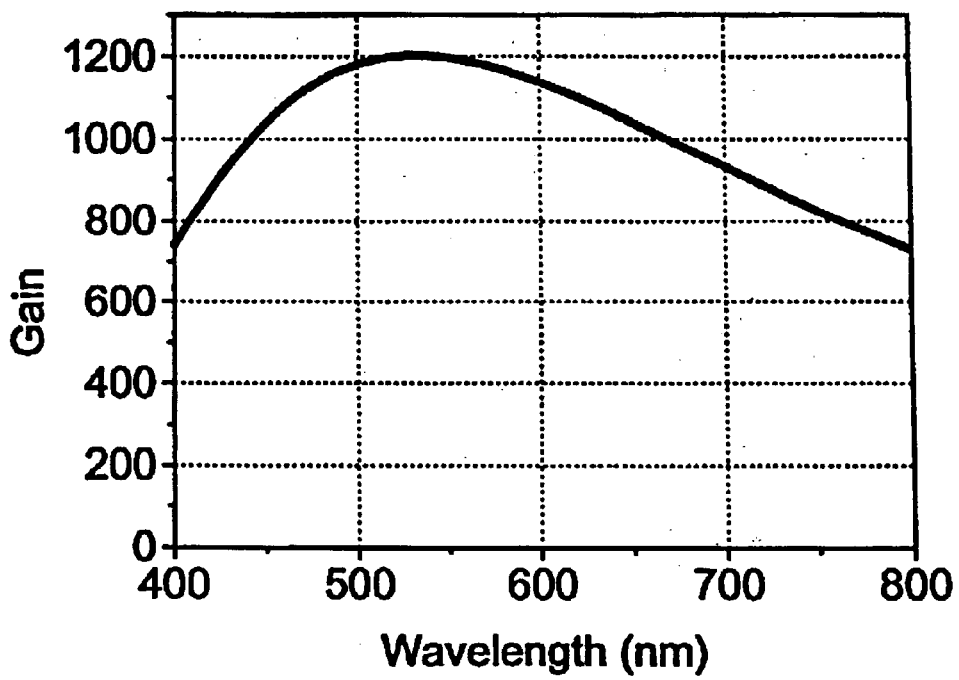
FIG. 3 shows the gain profile of the perfectly phase-matched OPA.

FIG. 3 shows the gain profile of the perfectly phase-matched OPA over the spectral range of interest. The non-uniformity of gain is the result of the dependence of the gain coefficient on the signal, idler and pump wavelength and their corresponding dispersion relations. If the seed entering the system 100 illustrated in FIG. 1 is chirped, the temporal profile of the pump pulse can be tailored in a simple way to produce uniform gain across the entire signal spectrum.

Figure 4:
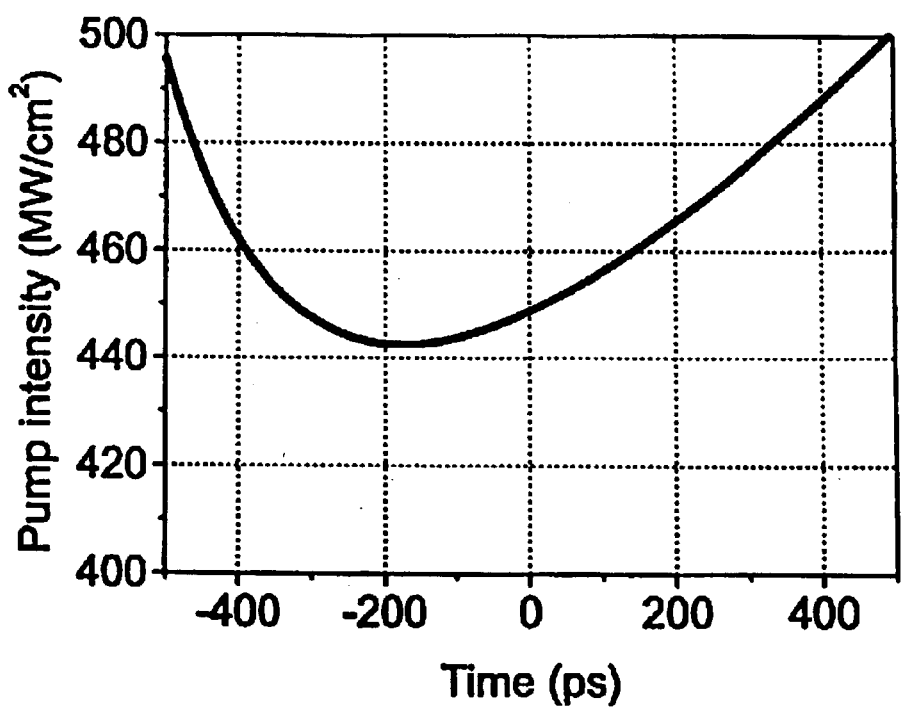
FIG. 4 shows the required modulation of the pump pulse to produce spectrally flat gain for an example 10 mm long BBO OPA pumped by a 1-ns, 266-nm pump pulse, at an maximum intensity of 500 MW/cm$^2$.

In FIG. 4, the required modulation of the pump pulse is depicted for an example 10-mm long BBO OPA pumped by a 1-ns 266-nm pump pulse, at an maximum intensity of 500 MW/cm$^2$. The small signal gain obtained from a single crystal in this configuration is 728. The signal pulse amplified in OPA can be then relay imaged back to an identical dispersive element and recollimated to provide amplified white light. Possible extensions of this scheme include amplification of broad bandwidth pulses for ultrashort pulse amplification, such as pulses centered at the Ti:sapphire peak of 800 nm.

Figure 5:
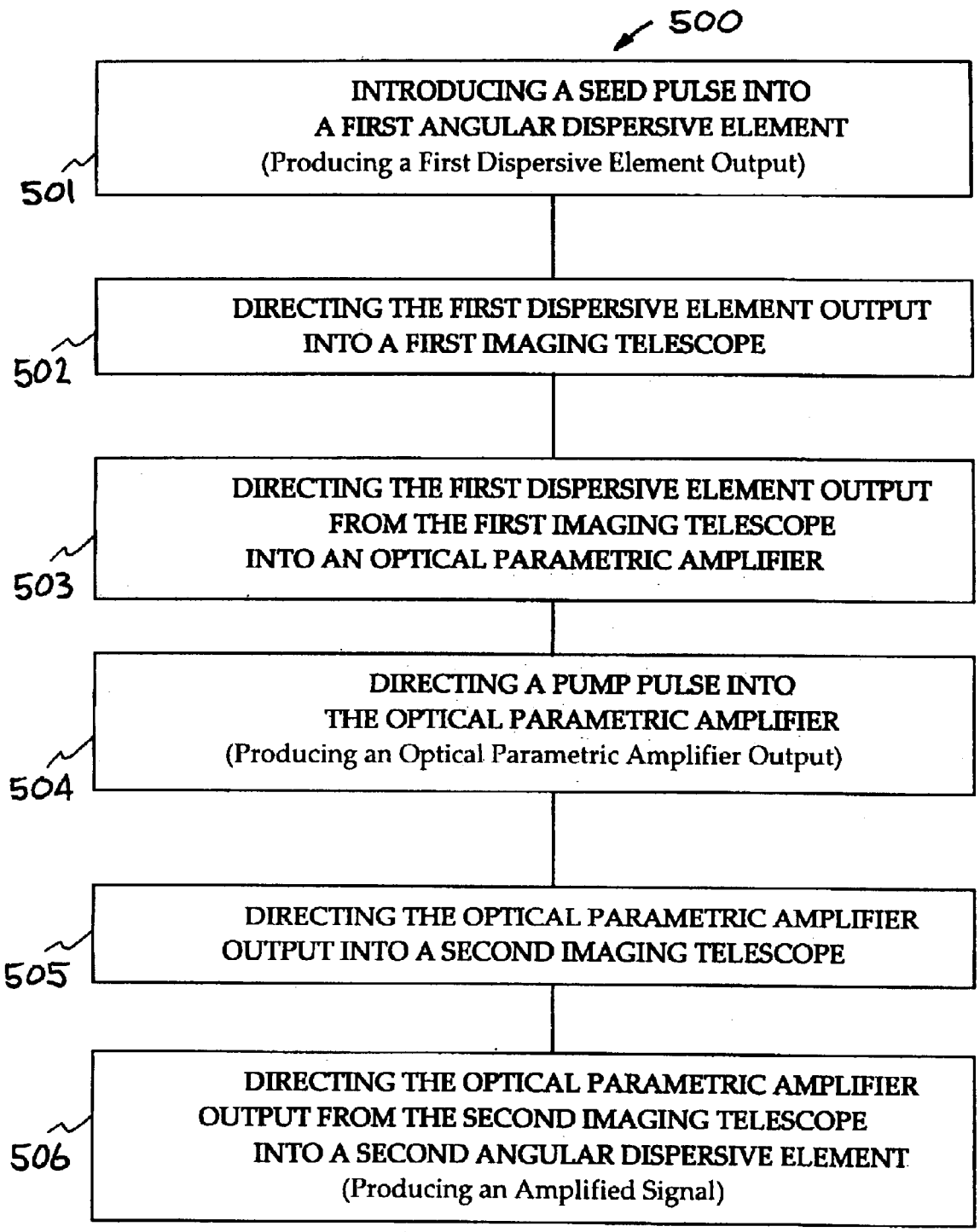
FIG. 5 illustrates another embodiment of a system constructed in accordance with the present invention.

Referring now to FIG. 5, another embodiment of a system constructed in accordance with the present invention is illustrated. The system is designated generally by the reference numeral 500. The system 500 provides a method of coherent simultaneous amplification of a broad spectral range of visible light. The present invention has many uses. For example, it can be used for amplification of ultrashort pulses in nanosecond optical parametric chirped pulse amplifiers. It can also be used for white light amplifiers and ultrashort pulse amplifiers for chirped pulse amplification systems.

The method 500 includes a number of steps. Step 501 comprises introducing a seed pulse into a first angular dispersive element producing a first dispersive element output. The wavelengths of visible light range from about 350–400 nm to about 750–800 nm. White seed 501 is introduced into an angular dispersion element 502 such as a prism or a diffraction grating. A combination of dispersive elements may be used to achieve the correct angular dispersion for phase matching in OPA.

Step 502 comprises directing the first dispersive element output into a first imaging telescope. Step 503 comprises directing the first dispersive element output from the first imaging telescope into an optical parametric amplifier. The imaging telescope relays the correct angular dispersion from the appropriate point at the output of the dispersive element to an optical parametric amplifier (OPA). Such angular dispersion can be easily reproduced in a multi-crystal system by relay imaging.

Step 504 comprises directing a pump pulse into the optical parametric amplifier, the optical parametric amplifier producing an optical parametric amplifier output. The pump provides a pump wavelength chosen to be 266 nm (the fourth harmonic of a Nd:YAG laser). Pump pulses at this wavelength can be obtained with relatively high energy. This pump wavelength is also convenient because it guarantees that the entire spectral range of the idler pulse remains within the transparency range for most nonlinear crystals commonly used as OPAs. The pump is introduced into the OPA at a noncollinear angle with respect to the signal center wavelength, which allows the angular dispersion of the seed to be nearly linear. It also permits easier separation of the idler beam in type I mixing.

Step 505 comprises directing the optical parametric amplifier output into a second imaging telescope. Step 506 comprises directing the optical parametric amplifier output from the second imaging telescope into a second angular dispersive element to produce an amplified signal.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system for coherent simultaneous amplification of a broad spectral range of light, comprising:
   an optical parametric amplifier,
   a source of a seed pulse,
   a first angular dispersive element operatively connected to said source of a seed pulse,
   a first imaging telescope operatively connected to said first angular dispersive element and operatively connected to said an optical parametric amplifier,
   a source of a pump pulse operatively connected to said optical parametric amplifier,
   a second imaging telescope operatively connected to said optical parametric amplifier, and
   a second angular dispersive element operatively connected to said second imaging telescope.

2. The system for coherent simultaneous amplification of a broad spectral range of light of claim 1 wherein said broad spectral range of light comprises visible light.

3. The system for coherent simultaneous amplification of a broad spectral range of light of claim 1 wherein said broad spectral range of light comprises white light.

4. The system for coherent simultaneous amplification of a broad spectral range of light of claim 1 wherein said broad spectral range of light comprises the wavelengths of visible light range from about 350–400 nm to about 750–800 nm.

5. The system for coherent simultaneous amplification of a broad spectral range of light of claim 1 wherein said source of a seed pulse provides white light seed.

6. The system for coherent simultaneous amplification of a broad spectral range of light of claim 1 wherein said first angular dispersive element is a prism.

7. The system for coherent simultaneous amplification of a broad spectral range of light of claim 1 wherein said first angular dispersive element is a diffraction grating.

8. The system for coherent simultaneous amplification of a broad spectral range of light of claim 1 wherein said first angular dispersive element is a combination of individual dispersive elements.

9. The system for coherent simultaneous amplification of a broad spectral range of light of claim 1 wherein said second angular dispersive element is a prism.

10. The system for coherent simultaneous amplification of a broad spectral range of light of claim 1 wherein said second angular dispersive element is a diffraction grating.

11. The system for coherent simultaneous amplification of a broad spectral range of light of claim 1 wherein said second angular dispersive element is a combination of individual dispersive elements.

12. The system for coherent simultaneous amplification of a broad spectral range of light of claim 1 wherein said first imaging telescope is a relay imaging system.

13. The system for coherent simultaneous amplification of a broad spectral range of light of claim 1 wherein said second imaging telescope is a relay imaging system.

14. The system for coherent simultaneous amplification of a broad spectral range of light of claim 1 wherein said source of a pump pulse provides a pump wavelength within the transparency range for most nonlinear crystals.

15. The system for coherent simultaneous amplification of a broad spectral range of light of claim 1 wherein said source of a pump pulse provides a pump wavelength that can be obtained with relatively high energy.

16. The system for coherent simultaneous amplification of a broad spectral range of light of claim 1 wherein said source of a pump pulse provides a pump wavelength that guarantees that the entire spectral range of the idler pulse remains within the transparency range for nonlinear crystals commonly used as OPAs.

17. The system for coherent simultaneous amplification of a broad spectral range of light of claim 1 wherein said source of a pump pulse provides a pump wavelength that is the fourth harmonic of a Nd:YAG laser.

18. The system for coherent simultaneous amplification of a broad spectral range of light of claim 1 wherein said source of a pump pulse provides a pump wavelength that is 266 nm.

19. The system for coherent simultaneous amplification of a broad spectral range of light of claim 1 wherein said source of a pump pulse produces a pump pulse that is introduced into said optical parametric amplifier at a noncollinear angle.

20. The system for coherent simultaneous amplification of a broad spectral range of light of claim 1 wherein said source of a pump pulse produces a pump pulse that is introduced into said optical parametric amplifier at a noncollinear angle which allows the angular dispersion of the seed to be nearly linear.

21. The system for coherent simultaneous amplification of a broad spectral range of light of claim 1 wherein said source of a pump pulse produces a pump pulse that is introduced into said optical parametric amplifier at a noncollinear angle with respect to the signal center wavelength.

22. The system for coherent simultaneous amplification of a broad spectral range of light of claim 1 wherein said source of a pump pulse produces a pump pulse that is introduced into said optical parametric amplifier at a noncollinear angle wherein the angle between the crystal z-axis and the pump beam is approximately 59.7°.

23. The system for coherent simultaneous amplification of a broad spectral range of light of claim 1 wherein said optical parametric amplifier comprises beta-barium borate.

24. The system for coherent simultaneous amplification of a broad spectral range of light of claim 1 wherein said optical parametric amplifier comprises lithium borate.

25. The system for coherent simultaneous amplification of a broad spectral range of light of claim 1 wherein said optical parametric amplifier comprises at least one of beta-barium borate or lithium borate (LBO), or potassium dihydrogen phosphate (KDP), or potassium, or trihydrogen phosphate (KTP), or lithium niobate (LiNbO3), or periodically poled lithium niobate (PPLN), or periodically poled trihydrogen phosphate (PPKTP), or potassium titanyl arsenate (KTA), or lithium iodate (LiO3).

26. A method of coherent simultaneous amplification of a broad spectral range of visible light, comprising the steps of:
    introducing a seed pulse into a first angular dispersive element producing a first dispersive element output;
    directing said first dispersive element output into a first imaging telescope;
    directing said first dispersive element output from said first imaging telescope into an optical parametric amplifier;
    directing a pump pulse into said optical parametric amplifier, said optical parametric amplifier producing an optical parametric amplifier output;
    directing said optical parametric amplifier output into a second imaging telescope; and
    directing said optical parametric amplifier output from said second imaging telescope into a second angular dispersive element.

27. The method for coherent simultaneous amplification of a broad spectral range of light of claim 26 wherein said broad spectral range of light comprises visible light.

28. The method for coherent simultaneous amplification of a broad spectral range of light of claim 26 wherein said broad spectral range of light comprises white light.

29. The method for coherent simultaneous amplification of a broad spectral range of light of claim 26 wherein said broad spectral range of light comprises the wavelengths of visible light range from about 350–400 nm to about 750–800 nm.

30. The method for coherent simultaneous amplification of a broad spectral range of light of claim 26 wherein said source of a seed pulse provides white seed.

31. The method for coherent simultaneous amplification of a broad spectral range of light of claim 26 wherein said first angular dispersive element is a prism.

32. The method for coherent simultaneous amplification of a broad spectral range of light of claim 26 wherein said first angular dispersive element is a diffraction grating.

33. The method for coherent simultaneous amplification of a broad spectral range of light of claim 26 wherein said first angular dispersive element is a combination of individual dispersive elements.

34. The method for coherent simultaneous amplification of a broad spectral range of light of claim 26 wherein said second angular dispersive element is a prism.

35. The method for coherent simultaneous amplification of a broad spectral range of light of claim 26 wherein said second angular dispersive element is a diffraction grating.

36. The method for coherent simultaneous amplification of a broad spectral range of light of claim 26 wherein said second angular dispersive element is a combination of individual dispersive elements.

37. The method for coherent simultaneous amplification of a broad spectral range of light of claim 26 wherein said first imaging telescope is a multi-crystal system.

38. The method for coherent simultaneous amplification of a broad spectral range of light of claim 1 wherein said first imaging telescope is a relay imaging system.

39. The method for coherent simultaneous amplification of a broad spectral range of light of claim 1 wherein said second imaging telescope is a multi-crystal system.

40. The method for coherent simultaneous amplification of a broad spectral range of light of claim 1 wherein said second imaging telescope is a relay imaging system.

41. The method for coherent simultaneous amplification of a broad spectral range of light of claim 1 wherein said pump pulse provides a pump wavelength within the transparency range for most nonlinear crystals.

42. The method for coherent simultaneous amplification of a broad spectral range of light of claim 1 wherein said pump pulse provides a pump wavelength that can be obtained with relatively high energy.

43. The method for coherent simultaneous amplification of a broad spectral range of light of claim 1 wherein said pump pulse provides a pump wavelength that guarantees that the entire spectral range of the idler pulse remains within the transparency range for nonlinear crystals commonly used as OPAs.

44. The method for coherent simultaneous amplification of a broad spectral range of light of claim 1 wherein said pump pulse provides a pump wavelength that is the fourth harmonic of a Nd:YAG laser.

45. The method for coherent simultaneous amplification of a broad spectral range of light of claim 1 wherein said pump pulse provides a pump wavelength that is approximately 266 nm.

46. The method for coherent simultaneous amplification of a broad spectral range of light of claim 1 wherein said pump pulse is introduced into said optical parametric amplifier at a noncollinear angle.

47. The method for coherent simultaneous amplification of a broad spectral range of light of claim 1 wherein said pump pulse is introduced into said optical parametric amplifier at a noncollinear angle which allows the angular dispersion of the seed to be nearly linear.

48. The method for coherent simultaneous amplification of a broad spectral range of light of claim 1 wherein said pump pulse is introduced into said optical parametric amplifier at a noncollinear angle with respect to the signal center wavelength.

49. The method for coherent simultaneous amplification of a broad spectral range of light of claim 1 wherein said pump pulse is introduced into said optical parametric amplifier at a noncollinear angle wherein the angle between the crystal z-axis and the pump beam is approximately 59.7°.

50. The method for coherent simultaneous amplification of a broad spectral range of light of claim 1 wherein said optical parametric amplifier comprises beta-barium borate.

51. The method for coherent simultaneous amplification of a broad spectral range of light of claim 1 wherein said optical parametric amplifier comprises lithium borate.

52. The method for coherent simultaneous amplification of a broad spectral range of light of claim 1 wherein said optical parametric amplifier comprises at least one of beta-barium borate or lithium borate (LBO), or potassium dihydrogen phosphate (KDP), or potassium, or trihydrogen phosphate (KTP), or lithium niobate (LiNbO3), or periodically poled lithium niobate (PPLN), or periodically poled trihydrogen phosphate (PPKTP), or potassium titanyl arsenate (KTA), or lithium iodate (LiO3).

* * * * *